Jan. 26, 1926.  1,571,056
G. KRENZLER
COUPLING FOR SINGLE THREAD LACE BRAIDING MACHINES
Filed March 8, 1922
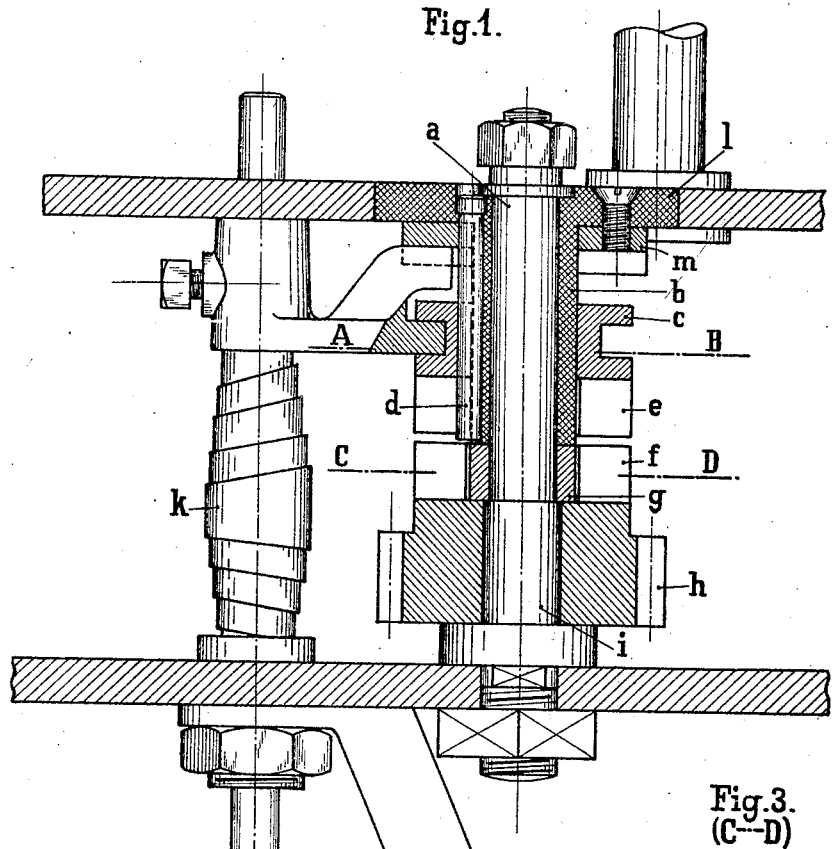
Fig.1.
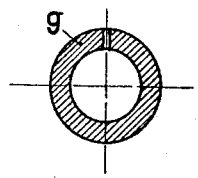
Fig.3. (C--D)
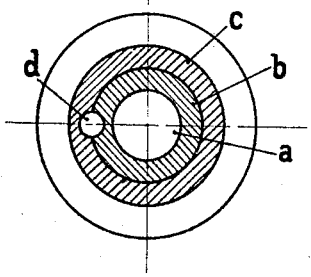
Fig.2. (A--B)
Inventor:
Gustav Krenzler
By Hauff Marland
Attorneys

Patented Jan. 26, 1926.

1,571,056

UNITED STATES PATENT OFFICE.

GUSTAV KRENZLER, OF BARMEN, GERMANY.

COUPLING FOR SINGLE-THREAD LACE-BRAIDING MACHINES.

Application filed March 8, 1922. Serial No. 542,116.

*To all whom it may concern:*

Be it known that I, GUSTAV KRENZLER, residing at Wertherstrasse, Barmen, Germany, have invented certain new and useful Improvements in Couplings for Single-Thread Lace-Braiding Machines, of which the following is a specification.

The invention relates in general to lace braiding machines and more particularly to the coupling between a carrier driver and its driving wheel. The object of the invention is to provide between the clutch or coupling and the driver shaft a round spline that can be easily removed and inserted from above. A further object of the invention is that the bearing that supports the rotatable bobbin driver is formed in the shape of a ring fastened to the vertical bolt or pillar around which the bobbin driver and its driven parts revolve.

A constructional form of the invention is illustrated in the drawing in which

Fig. 1 is a vertical section through a coupling according to the invention, associated with a carrier driver of a lace braiding machine in which the braiding carriers or plates act also as carrier drivers, Fig. 2 is a section on the line A—B of Fig. 1, Fig. 3 a section through the novel bearing or supporting ring on the line C—D of Fig. 1.

The device illustrated comprises an upright bolt or pillar $a$ around which the cylindrical bushing $b$ may be made to revolve. Surrounding the bushing $b$ and splined thereto by an easily removable pin $d$, so as to be capable of executing axial but not rotary movements relatively to the bushing $b$, is the one half $c$ of a clutch provided with gripping members $e$. $f$ are the gripping members of the other part of the clutch fixed to the driving wheel $h$. A ring $g$, which acts as a foot bearing to support the bushing $b$ and which is encircled by the clutch members $f$, is fastened to the pillar $a$. The toothed wheel $h$ is arranged to revolve around a section $i$ of increased diameter of the pillar $a$. The wheel $h$ is supported by a separate collar piece beneath the section $i$ of the pillar $a$. The bushing $b$ and the carrier driver $l$ are preferably made of one piece, while the disk $m$ with downwardly extending projections, with the aid of which the driver is held in its rest position, is fastened to the driver by means of screws.

The usual practice up to the present has been to use a section $i$ of a diameter corresponding to that of the ring $g$ as a vertical bearing for the toothed wheel $h$. Vertical bearings of so great a diameter for the toothed wheels $h$ produce so much friction that a machine with a considerable number of driving wheels $h$ consumes very much power. The pillars of the present invention are of smaller diameter than those now in practice and therefore are much cheaper.

It will be obvious that the novel arrangement is also applicable to machines in which separate plates and carrier drivers arranged beneath the plates are employed.

I claim:—

1. In a lace braiding machine, a pillar having a part of normal diameter and a part of reduced diameter, a carrier driver with a bushing on it surrounding the reduced part of the said pillar, a clutch member slidable but not rotatable on the said bushing, a driver wheel adapted to be coupled with the said clutch member and surrounding the said pillar on its part showing the normal diameter, and a ring of a greater diameter than the normal diameter of the said pillar supporting the said bushing and supported by the said normal part of the said pillar.

2. In a lace braiding machine, a pillar having a part of normal diameter and a part of reduced diameter, a carrier driver with a bushing on it surrounding the reduced part of the said pillar, a clutch member slidable but not rotatable on the said bushing, a driver wheel adapted to be coupled with the said clutch member and surrounding the said pillar on its part showing the normal diameter, and a ring of greater diameter than the normal diameter of the said pillar supporting the same bushing and clamped round the reduced part of the said pillar.

3. In a lace braiding machine, a pillar having a part of normal diameter and a part of reduced diameter, a carrier driver with a bushing on it surrounding the reduced part of the said pillar, a clutch member slidable but not rotatable on the said bushing, a driver wheel adapted to be coupled with the said clutch member and surrounding the said pillar on its part showing the normal diameter, and a ring of greater diameter than the normal diameter of the said pillar supporting the said bushing and clamped round the reduced part of the said pillar and supported by the said normal part of the said pillar.

4. In a lace braiding machine, a pillar having a part of normal diameter and a part of reduced diameter, a carrier driver with a bushing on it surrounding the reduced part of the said pillar, a clutch member slidable but not rotatable on the said bushing, a driver wheel adapted to be coupled with the said clutch member and surrounding the said pillar on its part showing the normal diameter, and a ring of a greater diameter than the normal diameter of the said pillar supporting the said bushing and supported by the said normal part of the said pillar, the said ring being arranged within that part of the said wheel adapted to cooperate with the said clutch member.

In testimony whereof I have affixed my signature.

GUSTAV KRENZLER.